March 11, 1958

E. VAN DER PYL 2,826,314

TUNNEL KILN LOADING AND DISCHARGING MECHANISM

Filed Oct. 28, 1953

INVENTOR.
EDWARD VAN der PYL

BY

Harold W. Eaton

ATTORNEY

March 11, 1958     E. VAN DER PYL     2,826,314
TUNNEL KILN LOADING AND DISCHARGING MECHANISM
Filed Oct. 28, 1953     4 Sheets-Sheet 2
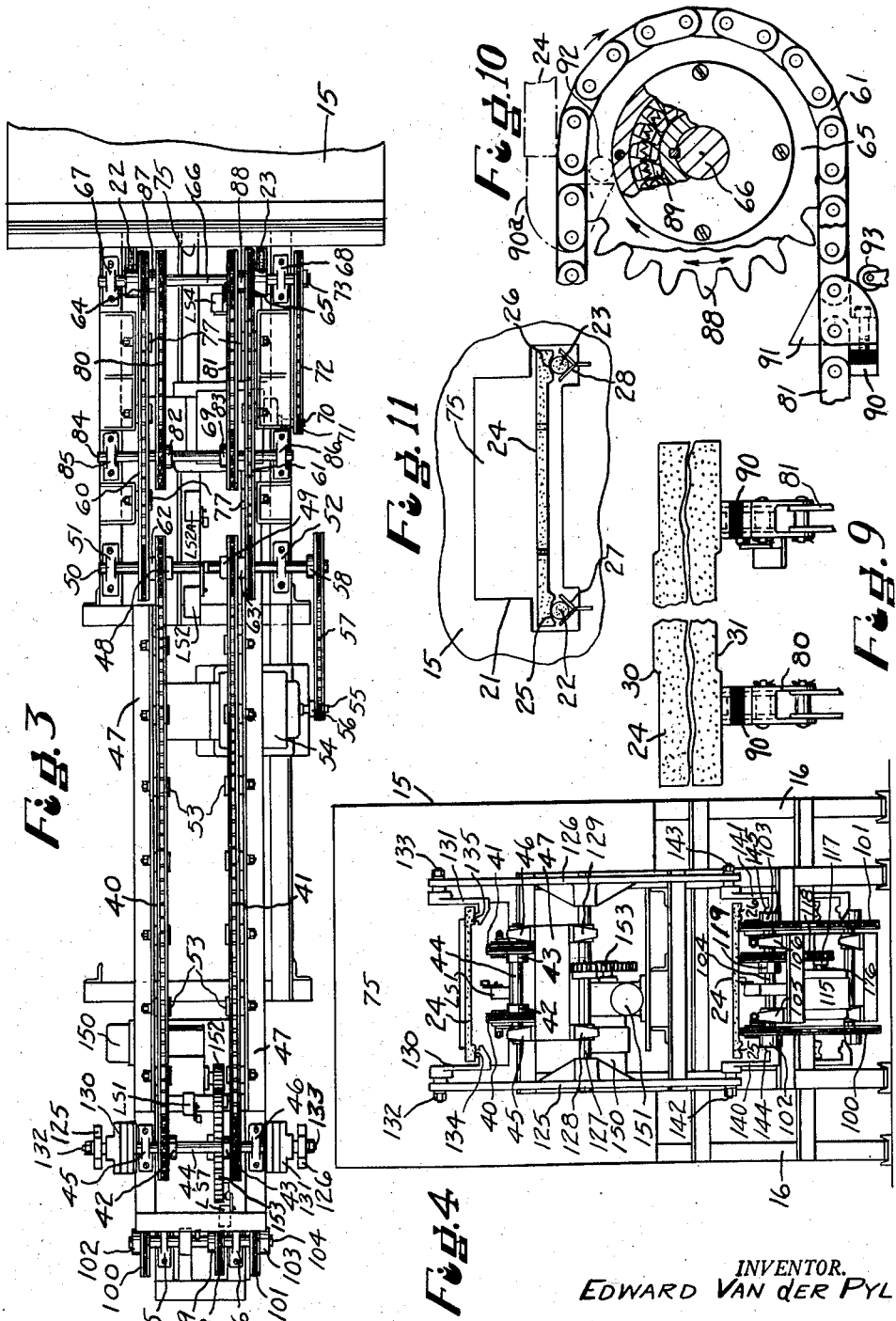
INVENTOR.
EDWARD VAN der PYL
BY
Harold W. Eaton
ATTORNEY March 11, 1958     E. VAN DER PYL     2,826,314
TUNNEL KILN LOADING AND DISCHARGING MECHANISM
Filed Oct. 28, 1953     4 Sheets-Sheet 3

INVENTOR.
EDWARD VAN dER PYL
BY
Harold W. Eaton
ATTORNEY

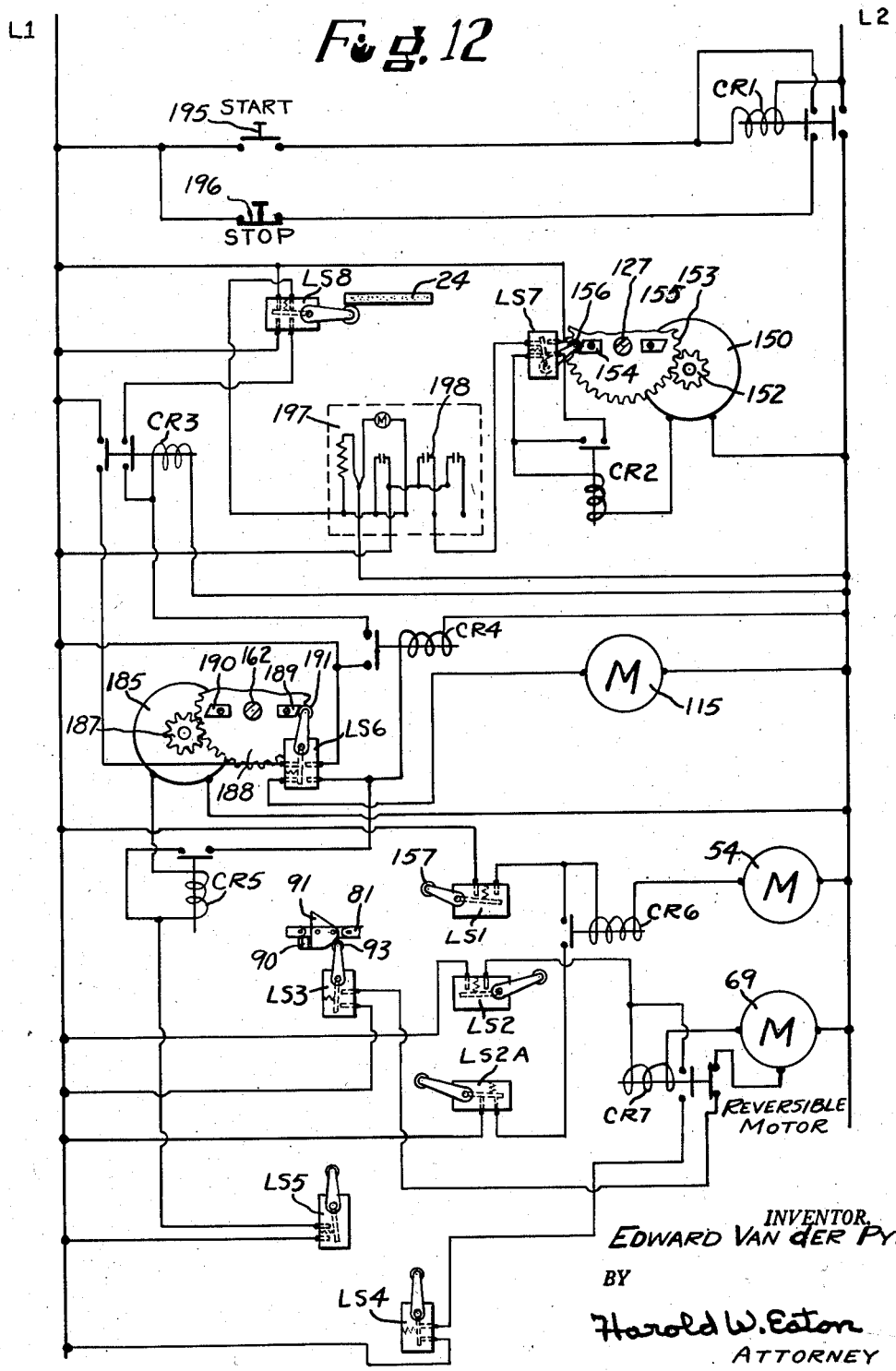

United States Patent Office 2,826,314
Patented Mar. 11, 1958

2,826,314

TUNNEL KILN LOADING AND DISCHARGING MECHANISM

Edward Van der Pyl, Holden, Mass., assignor to Norton Company, Worcester, Mass., a corporation of Massachusetts Application October 28, 1953, Serial No. 388,844

11 Claims. (Cl. 214—23)

The invention relates to tunnel kilns and more particularly to a loading and discharge mechanism for feeding "green" ware, such as, grinding wheels into and through a tunnel kiln, and for removing the vitrified ware or wheels from the kiln, thus making the kiln automatic in operation.

One object of the invention is to provide a simple and thoroughly practical tunnel kiln for increasing the rate of production of vitrified products such as grinding wheels. Another object is to provide a tunnel kiln with an automatic loading and discharge mechanism whereby batts loaded with green ware may be fed intermittently to and through the tunnel kiln and discharged therefrom at a controlled rate. Another object of the invention is to provide a mechanism for returning the batts of fired ware from the discharge end of the kiln to the front of the kiln to facilitate loading and unloading of ware. Another object is to provide a return conveyor for conveying batts of fired ware from the discharge end of the kiln to the front or loading station thereof. Another object is to provide an automatically actuated transfer mechanism for transferring batts of fired ware from the discharge end of the kiln onto the return conveyor. Another object of the invention is to provide an automatically actuated transfer mechanism for transferring batts of fired ware from the return conveyor onto a feed conveyor to facilitate unloading and loading of ware onto the batts before being recirculated through the kiln. A further object is to provide a ware loading and discharging mechanism which is arranged so that the ware to be fired may be loaded and the ware after firing may be discharged at a single station at the entering end of the kiln. Other objects will be in part obvious or in part pointed out hereinafter.

In the accompanying drawings illustrating a tunnel kiln, an automatic loading, feeding and discharging mechanism for propelling ware through the kiln, Fig. 1 is a side elevation of an electric tunnel kiln equipped with the improved loading, feeding and discharging mechanism;

Fig. 3 is a fragmentary plan view of the loading and feeding mechanism as shown in Fig. 2;

Fig. 4 is a front elevation of the tunnel kiln showing the loading mechanism;

Fig. 9 is a fragmentary plan view, on an enlarged scale, of the pusher chains showing the actuating dogs in operative engagement with a batt to push the batt into the kiln;

Fig. 10 is a fragmentary detailed view, on an enlarged scale, through one of the driving sprockets for the carrier chains, partly broken away and shown in section to show the ball clutch drive for the sprocket;

Fig. 11 is a fragmentary end elevation showing the kiln entering aperture with a batt and the supporting rails therefor, and Fig. 12 is an electrical wiring diagram of the electrical actuating mechanisms and the controls therefor.

Figure 1:
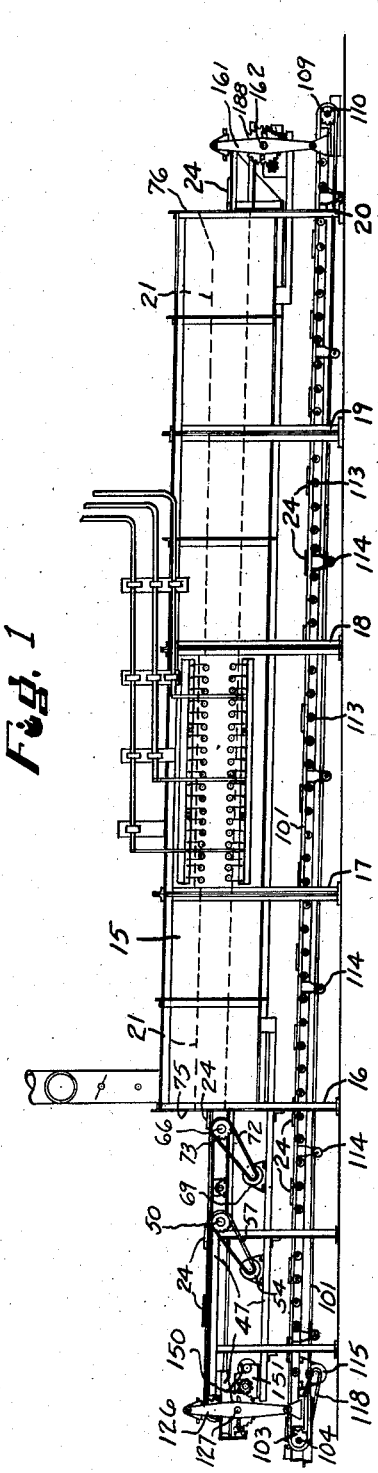

Referring first to Figs. 1, 2, 3, 4 and 5, the kiln which is generally indicated by the numeral 15 is mounted on a plurality of legs 16, 17, 18, 19 and 20. The kiln 15 may be substantially the same as that shown in the U. S. Patent No. 2,519,250 to George N. Jeppson, Edward Van der Pyl and Wallace L. Howe, dated August 15, 1950, to which reference may be had for details of disclosure not contained herein. As shown, the kiln 15 has the shape of a parallelpiped which is rectangular in cross section and is slightly inclined. The pitch of this inclination is actually about one foot in twenty-three, which is an angle of approximately 2° 28'. Preferably it should not be much less than say 2°, nor much greater than 8°. The purpose of the downward pitch, in Fig. 1 the left hand end of the kiln is the entrance, is to drive more of the hot gases toward the entrance end of the kiln; some of the gases go to the annealing zone.

The kiln 15 is provided with a longitudinally extending kiln aperture or chamber 21 within which extends a pair of spaced parallel rails 22 and 23 which serve as slideways or guides for a plurality of batts 24 to carry wares to be fired through the kiln. The rails 22 and 23 are preferably cylindrical in cross section and are supported at their outer ends outside the kiln 15 by Y-shaped supporting members 27 and 28. The batts 24 are provided on their under surface with the parallel grooves 25 and 26 which are arranged to slide upon the rails 22 and 23 respectively.

In order to maintain the batts in line as they pass through the kiln chamber 21, the leading edges of the batts are provided with a tongue 30 which is arranged to engage or mate with a groove 31 formed in the trailing edge of the adjacent batt.

The present invention relates to an improved loading and discharging mechanism which is arranged so that batts may be loaded and unloaded by a single operation from a point adjacent to the front of the kiln. The discharge mechanism is arranged to return the batts containing the fired ware to the front of the kiln preferably on a lower level after which the batts may be then raised to a starting position where the fired wares may be removed therefrom and green wares to be fired loaded on the batt before it starts the next passage through the kiln 15.

The loading mechanism preferably comprises a pair of spaced continuous link chains 40 and 41 which form a feed conveyor. The chains 40 and 41, at one end, wrap around a pair of sprockets 42 and 43 respectively which are carried by a shaft 44. The shaft 44 is journalled in a pair of spaced bearings 45 and 46 which are in turn fixedly mounted on a supporting frame 47. The other ends of the chains 40 and 41 wrap around a pair of sprockets 48 and 49 respectively which are fixedly mounted on a drive shaft 50. The drive shaft 50 is journalled in a pair of spaced bearings 51 and 52 which are also fixedly mounted on the frame 47. A plurality of pairs of rollers 53 are provided on the frame 47 which are arranged to serve as idlers to support the chains 40 and 41 between the sprockets above referred to.

The chains 40 and 41 serve as a feed conveyor for conveying batts 24 toward and onto carier chains and pusher chains to be hereinafter described. A suitable driving mechanism is provided for the chains 40 and 41 comprising an electric motor 54 having a motor shaft 55 which carries a sprocket 56. The sprocket 56 is connected by a link chain 57 with a sprocket 58 mounted on one end of the drive shaft 50. The sprockets 58, 48 and 49 are fixedly mounted on the drive shaft 50 so that the motor 54 when started will cause a motion of the feed conveyor chains 40 and 41 respectively. The chains 40 and 41 are arranged to support the batts 24 as they are moved toward the entrance end of the kiln 15.

The feed conveyor chains 40 and 41 are arranged to advance the batts 24 onto a pair of spaced carrier chains 60 and 61. The carrier chains 60 and 61 at one end wrap around a pair of sprockets 62 and 63 which are rotatably supported on the shaft 50. The other ends of the carrier chains 60 and 61 wrap around a pair of sprockets 64 and 65 which are fixedly mounted on a drive shaft 66. The drive shaft 66 is journalled in a pair of spaced bearings 67 and 68 carried by the frame 47. A suitable driving mechanism is provided for rotating the shaft 66 which preferably comprises a motor 69 mounted on the frame 47. The motor 69 is provided with a motor shaft 70 having a driving sprocket 71 fixedly mounted thereon. The driving sprocket 71 is connected by a link chain 72 with a sprocket 73 fixedly mounted on one end of the shaft 66. It will be readily apparent from the foregoing disclosure that the motor 69 serves to drive the carrier chains 60 and 61 so as to pick up batts from the feed chains 40 and 41 respectively and move the batt 24 toward the entrance to the kiln chamber 21.

During operation of the kiln there is a continuous line of batts 24 extending from the entrance end 75 to the discharge end 76 of the kiln 15. A plurality of spaced pairs of idler rollers 77 are provided for supporting the carrier chains 60 and 61 between the pairs of supporting sprockets.

Batts 24 are intermittently fed onto the feed chains 40 and 41 which in turn move the batts intermittently onto the carrier chains 60 and 61 respectively.

A suitable power operated mechanism is provided for intermittently pushing the continuous line of batts through the kiln chamber 21 so that the batts 24 containing the green ware to be fired are intermittently advanced through the kiln aperture 21 from the entrance end 75 to the dicharge end 76 during which time the wares are fired to vitrify the bonding material to the desired and predetermined extent.

A power operated pusher mechanism is provided for moving a batt 24 into engagement with the end of the train of batts which extends through the kiln 15 to advance the entire train of batts by a predetermined distance, such as a distance equal to the length of one batt. The mechanism may comprise a pair of spaced pusher chains 80 and 81 which are supported at one end by a pair of spaced sprockets 82 and 83. The spaced sprockets 82 and 83 are supported on an idler shaft 84 which is journalled in spaced bearings 85 and 86 fixedly mounted on the frame 47. The other ends of the pusher chains 80 and 81 wrap around a pair of spaced sprockets 87 and 88 carried by the drive shaft 66. The pusher chains 80 and 81 are each provided with a pusher dog 90. The sprockets 64 and 65, which drive the carrier chains 60 and 61, are each connected by an overrunning clutch 89 with the shaft 66 so that the direction of rotation of the shaft 66, sprockets 87 and 88 may be reversed to return the dogs 90 to initial positions without moving the carrier chains 60 and 61. The motor 69 is preferably a reversible motor which serves to rotate the shaft 66 in opposite directions in a manner to be hereinafter described. When the leading edge of one of the batts 24 reaches a point above the center line of the drive shaft 50, the batt engages the actuating roller of a limit switch LS2 to start the motor 69 to start rotation of the drive shaft 66 thereby starting both of the pairs of chains, the carrier chains 60—61 and the pusher chains 80—81 with their upper surfaces traveling toward the entrance of the kiln 15. During this movement of the pusher chains 80—81, the dogs 90 move into the dotted line position 90a (Fig. 10) with the face of the dogs 90 engaging the trailing edge of a batt 24. The continued movement of the pusher chains 80—81 serves through the dogs 90 to push the new batt 24 into engagement with the train of batts extending through the kiln and to advance the entire train of batts by a distance equal to the length of one batt. When the new batt reaches this position a projection 91 on the dog 90 engages the actuating roller 92 (Fig. 10) of a limit switch LS4 which serves to reverse the direction of rotation of the motor 69 so that pusher chains 80—81 travel in a counter-clockwise direction to return the pusher dogs 90 into the full line position (Fig. 10). During this reverse movement of the pusher chains 80—81, due to the overrunning clutches 89, no motion is imparted to the carrier chains 60—61. When the dogs 90 reach the initial position as illustrated in full lines in Fig. 10, the dogs 90 engage the actuating roller 93 of a limit switch LS3 to stop the motor 69.

Figure 7:
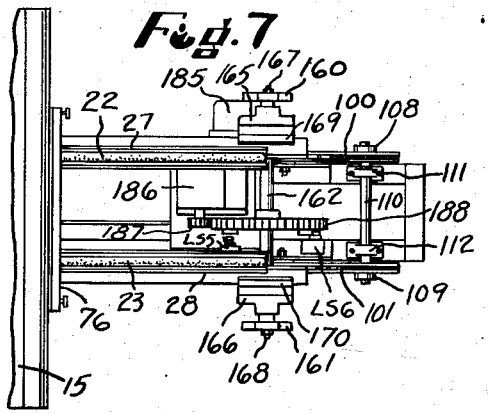
Fig. 7 is a fragmentary plan view of the ware discharge mechanism.
Figure 8:
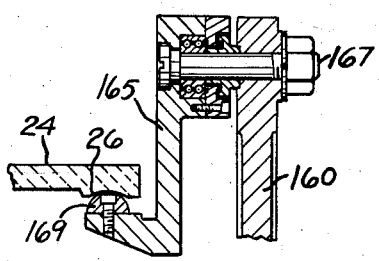
Fig. 8 is a fragmentary sectional view, on an enlarged scale, through one of the work transfer arms, showing the pivotally mounted batt transfer member.
Figure 5:
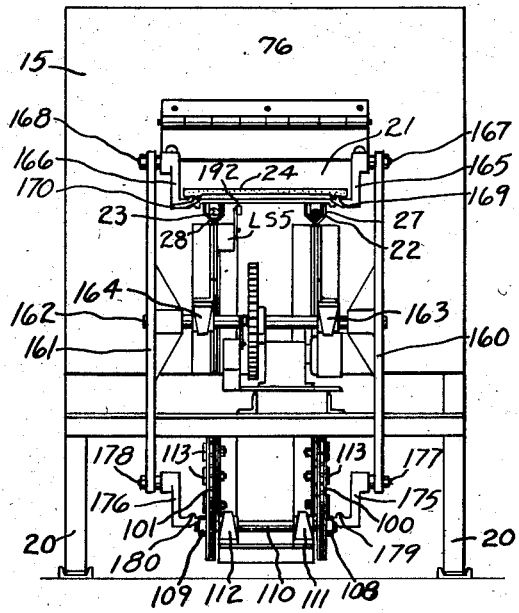
Fig. 5 is a rear elevation of the tunnel kiln showing the discharge mechanism.

It is desirable to provied suitable means for automatically returning batts after the firing operation to the entering end to facilitate operation of the tunnel kiln. As illustrated in the drawings, a pair of spaced return conveyor chains 100 and 101 are provided for returning batts of fired material from the rear end of the kiln to the front. The conveyor chains 100—101 wrap around a pair of spaced sprockets 102 and 103 respectively which are supported on a shaft 104 (Fig. 3) which is journalled in spaced bearings 105 and 106 fixedly mounted on the frame 47. Similarly the other ends of the conveyor chains 100 and 101 wrap around spaced sprockets 108 and 109 respectively which are mounted on a shaft 110 journalled in spaced bearings 111 and 112 respectively (Figs. 5 and 7). A plurality of spaced pairs of idler rollers 113 are provided on the frame 47 between the sprockets 102—103 and 108—109 to support the upper run of the chains. A plurality of pairs of spaced idlers 114 are provided for supporting the slack or lower portion of the conveyor chains 100 and 101 respectively. These idlers are also supported on the frame 47.

A suitable driving mechanism is provided for the conveyor chains 100—101 comprising a motor 115 mounted on the frame 47. The motor 115 is provided with a motor shaft 116 having a sprocket 117 which is connected by a link chain 118 with a sprocket 119 fixedly mounted on the shaft 104.

A batt transfer mechanism is provided for automatically transferring batts of fired material from the return conveyor chains 100—101 and placing the batts 24 on the feed conveyor chains 40—41. This mechanism may comprise a pair of spaced transfer arms 125—126 which are fixedly mounted on a rotatable shaft 127. The shaft 127 is journalled in bearing 128 and 129. The upper ends of the arms 125—126 pivotally support a pair of arms 130 and 131 on studs 132 and 133 respectively. The arms 130 and 131 are substantially L-shaped as illustrated in Fig. 4 and are provided with ribs 134 and 135 respectively which are arranged to mate with the grooves 25 and 26 formed in the under side of the batts 24.

The lower end of the transfer arms 125—126 are similarly provided with substantially L-shaped arms 140—141 respectively which are mounted on pivot studs 142 and 143 respectively which are carried by the transfer arms 125—126. The arms 140 and 141 are provided with ribs 144 and 145 respectively which are arranged to mate with grooves 25 and 26 formed in the side of the batts 24.

The transfer arms 125 and 126 together with their associated parts above described are arranged so that when the transfer arms 125 and 126 are revolved in a clockwise direction through 180°, the ribs 144—145 engage grooves 25 and 26 on a batt 24 which is supported on the return conveyor chains 100—101 and swings the batt upwardly and into supporting engagement with the feed conveyor chains 40—41. A suitable driving mechanism is provided for the transfer mechanism above described comprising a motor 150 which drives through a gear reducer unit 151 to a pinion 152 which meshes with a gear 153 fixedly mounted on the shaft 127. It will be readily apparent from the foregoing disclosure that when the motor 150 is set in motion a revolving movement will be imparted through the mechanism above described to rotate the shaft 27 and to revolve the transfer arms 125 and 126. A pair of cams or lugs 154—155 are fixedly mounted on the side face of the gear 153. The lugs 154 and 155 are arranged in the path of an actuating roller 156 of a limit switch LS7 which is operatively connected to stop the motor 150 after the transfer arms 125 and 126 have revolved through 180°.

When the batt 24 is swung into operative engagement with the feed conveyor chains 40—41, the batt 24 engages an actuating roller 157 of a limit switch LS1 which is operatively connected to start the motor 54 thereby starting movement of the feed carrier chains 40—41 to advance the batt 24 toward the entrance end 75 of the kiln 15.

Figure 6:
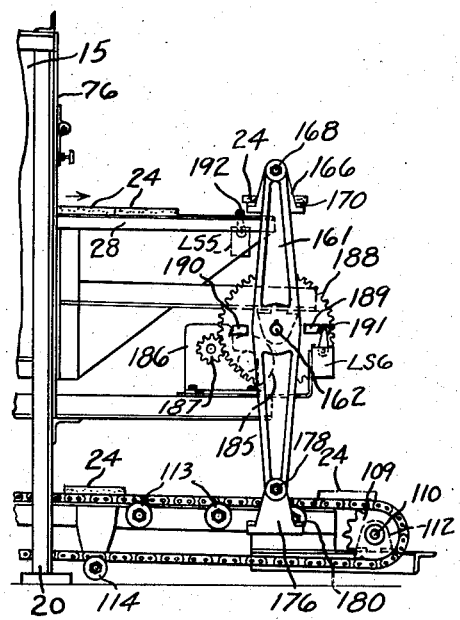
Fig. 6 is a fragmentary side elevation of the ware discharge mechanism as shown in Fig. 5.

A similar batt transfer mechanism is provided at the rear end of the tunnel kiln as shown in Figs. 5, 6 and 7. This transfer mechanism comprises a pair of spaced transfer arms 160 and 161 which are fixedly mounted on a rotatable shaft 162 journalled in spaced bearings 163 and 164 on the frame 47. The upper ends of the transfer arms 160—161 are provided with substantially L-shaped arms 165 and 166 respectively which are pivotally supported by a pair of studs 167 and 168 carried by the upper ends of the transfer arms 160 and 161 respectively. The arms 165 and 166 are provided with ribs 169 and 170 respectively which are arranged to engage grooves 25 and 26 formed in the under side of the batts 24 to lift the batts 24 from the discharge end of the kiln and to transfer the batts of fired ware onto the return conveyor chains 100—101.

Similarly the lower ends of the arms 160—161 are provided with substantially L-shaped arms 175 and 176 supported by studs 177 and 178 which are carried by the transfer arms 160 and 161 respectively. The arms 175 and 176 are provided with ribs 179 and 180 respectively which are arranged to engage grooves 25 and 26 formed in the under sides of the batts 24.

A driving mechanism is provided for actuating the transfer mechanism above described comprising a motor 185 which drives a gear reduction unit 186 having a driven pinion 187 which meshes with a gear 188 fixedly mounted on the shaft 162. It will be readily apparent from the foregoing disclosure that when the motor 185 is started, a rotary motion will be imparted to the shaft 162 to revolve the transfer arms 160—161 in a clockwise direction (Fig. 6).

The gear 188 is provided with cams or lugs 189 and 190 which are arranged to engage an actuating roller 191 of a limit switch LS6 to stop the transfer driving motor 185 after the transfer arms 160—161 have been revolved through 180° to effect a tranfer operation transferring a batt 24 from the supporting rails 22—23 at the rear end of the kiln and placing the batt on the return conveyor chains 100—101. At the same time actuation of the limit switch LS6 by either the lug 189 or the lug 190 on the gear 88 serves to start the motor 115 thereby starting the return conveyor chains 100—101 so that the batts supporting fired wares are advanced toward the entrance end of the kiln.

As a batt 24 supporting fired material emerges from the rear end 76 of the kiln 15, the batt moves into engagement with an actuating roller 192 of a limit switch LS5 which is operatively connected to start the transfer driving motor 185.

Referring now to Fig. 12, to start the operation of the loading and discharge mechanism, a push button start switch 195 is closed to energize a relay switch CR1 so as to complete the circuit through line L2. The energizing of CR1 sets up a holding circuit so that the line L2 is connected unless or until a stop switch 96 is actuated to deenergize CR1. Assuming a batt 24 on the return conveyor chains 100—101 to have moved into engagement with the actuating roller to shift the limit switch LS8 into the position illustrated in Fig. 12 which closes a circuit to render an electric timer 197 operative. This electric timer may be any of the well known commercial timers such as for example the "Microflex" timer manufactured by the Signal Electric Company of Moline, Illinois. After a predetermined time interval has elapsed a pair of contactors 198 in the timer are closed to close a circuit through the limit switch LS7 so as to energize a relay switch CR2 to start the motor 150 thereby causing the loader transfer arms 125—126 to swing in a clockwise direction. The batt 24 on the return conveyor chains 100—101 is picked up by the arms 140—141 and swung through 180° ready for the next loading operation. When the time transfer arms 125—126 start moving in a clockwise direction, the batt 24 supported by the arms 130—131 is moved onto the feed conveyor chains 40—41. When the batt 24 is moved onto the chains 40—41, the batt engages the actuating roller 157 of the limit switch LS1 to close a circuit thereby energizing a relay switch CR6 and starting the feed conveyor motor 54. When the relay CR6 is energized a holding circuit is set up through a normally closed limit switch LS2A. The feed conveyor chains 40—41 start moving the batt 24 toward the right (Fig. 2) toward the entrance end 75 of the tunnel kiln 15. There may be several batts on the feed carrier chains 40—41.

Figure 2:
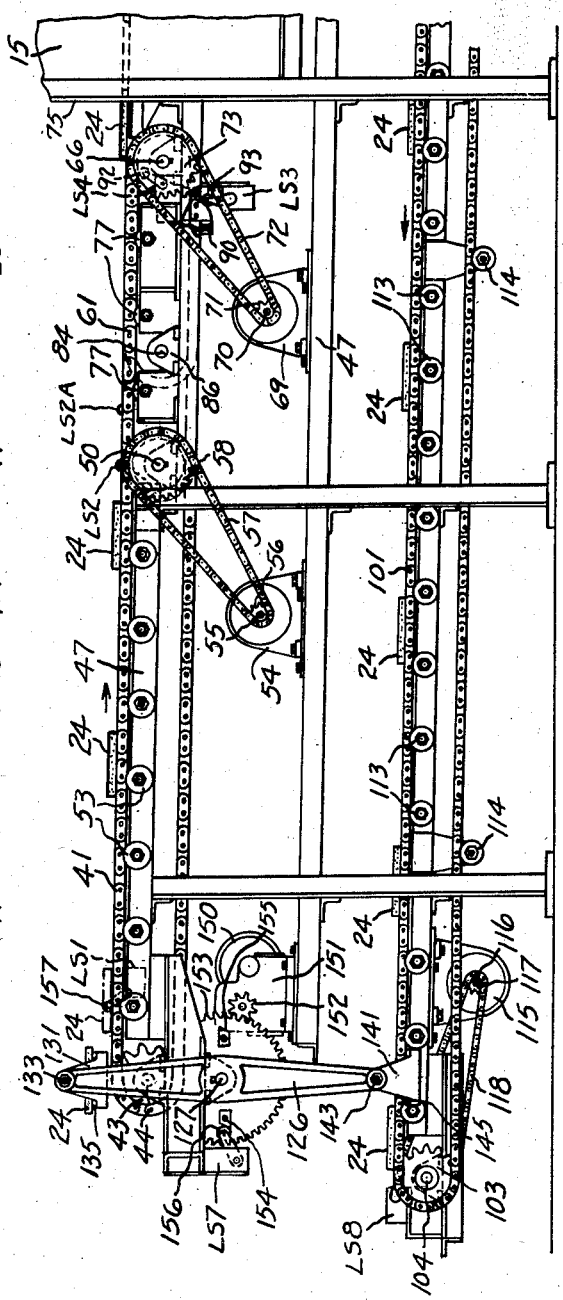
Fig. 2 is a fragmentary side elevation, on an enlarged scale, of the wheel loading and feeding mechanism.

When the first batt 24 engages and actuates a normally open limit switch LS2, a circuit is closed to energize a relay switch CR7 to start the reversible motor 69 which serves to start movement of the carrier chains 60—61 and the pusher chains 80—81 with the upper surface travelling toward the right (Figs. 1 and 2). When relay switch CR7 is energized a holding circuit is set up through a normally closed limit switch LS4. The batt 24 moves off the feed conveyor chains 40—41 and onto the carrier chains 60—61. When the leading edge of the batt 24 engages the actuating roller of the limit switch LS2A, the switch opens and breaks the holding circuit for the relay switch CR6 thereby stopping the motor 54 and the feed conveyor chains 40—41. The carrier chains 60—61 continue the movement of the batt 24 toward the right until the pusher chains 80—81 advance the dogs 90 carried by the pusher chains 80—81 into engagement with the trailing edge of the batt 24. Continued movement of the pusher chains 80—81 moves the batt 24 up into engagement with the end of the train of batts extending through the entire tunnel kiln 15. As the batt approaches this position, a detent 91 on the dogs 90 engages the actuating roller 92 of the limit switch LS4 to open the circuit thereby breaking the holding circuit to deenergize the relay switch CR7 so as to reverse the motor 69 thereby withdrawing the dogs 90 into the initial position as shown in Fig. 10. When the dogs reach the full line position as indicated in Fig. 10, the dog 90 engages the actuating roller 93 of a normally closed limit switch LS3 to open a circuit thereby stopping the motor 69 and the pusher chains 80—81. During the movement of the dogs 90, the new batt advances the train of batts extending through the kiln by a distance equal to the length of one batt. At the other end of the kiln one batt is moved on the rails 22—23 out of the discharge end of the kiln.

The lead edge of the batt 24 engages the actuating roller 192 of a normally open limit switch LS5 to close a circuit thereby energizing a relay switch CR5 to start the motor 185 which moves the transfer arms 160—161 in a clockwise direction to transfer a batt from the position illustrated in Fig. 6 onto the return conveyor chains 100—101. Rotation of the gear 188 during movement of the transfer arms 160—161 causes the lug 189 to ride off the actuating roller 191 of the limit switch LS6 to shift the limit switch in a counter-clockwise direction to set up a holding circuit to maintain the relay switch CR5 energizing at the same time the limit switch LS6 shifts, it closes a circuit to energize a relay switch CR4 to close a circuit thereby energizing a relay switch CR3. The deenergizing of CR3 closes a contact so that when the lug 190 on the gear 188 moves through 180° to engagement, the actuated roller 191 will again shift the limit switch LS6 into the position illustrated in Fig. 12, a circuit will be closed to start the motor 115. When the transfer arms 160—161 have moved through 180° and the lug 190 engages the actuating roller 191, the limit switch LS6 is actuated to deenergize the relay switches CR4 and CR5 and to stop the motor 185 with the transfer arms 160—161 in a substantially vertical position. At the same time the contactors of the limit switch CR3 which were previously closed complete a circuit to start the motor 115 thereby starting the return conveyor chains 100—101 so that the batts 24 move in a direction toward the left (Figs. 1 and 2). When the first batt 24 on the return conveyor chains 100—101 moves into engagement with the actuating roller of the limit switch LS8 to actuate the same, the limit switch breaks the holding circuit for the relay switch CR3 thereby deenergizing the same and stops the motor 115 to stop the movement of the return conveyor chains 100—101. At the same time actuation of the limit switch LS8 by the batt 24 serves to again energize the electric timer 197 to start the next cycle.

In starting up the kiln, before the cycle may be carried on automatically it is necessary to feed either unloaded batts or batts loaded with dummy ware into the kiln so that there is a continuous line of batts from the entrance end 75 to the discharge end 76 and to also position spaced batts on the return conveyor chains 100—101. The kiln may be loaded with batts by manually placing batts either unloaded or loaded with dummies onto the feed conveyor chains 40—41 where they will be intermittently advanced as above described. When a sufficient number of batts have been loaded in this manner to form a continuous train of batts through the kiln aperture 21 from the entrance end 75 to the desirable end 76, the automatic cycle of operation may then be started in the manner above described by first closing the start switch 195 after which the batts will be intermittently fed into and through the kiln and after being discharged therefrom will be automatically returned to the front of the machine and transferred onto the feed conveyor chains 40—41 where firing wares may be removed therefrom and green wares to be fired placed on the batt 24 before it again moves into the tunnel kiln 75. The interval of feeding may be regulated by adjusting the time relay 197 so that the desired number of batts per hour may be fed into the kiln. The loading and discharge mechanism may if desired be stopped at any time by opening the stop switch 196. It will be readily apparent from the foregoing disclosure that after the green wares to be fired are placed on the batt, the batts 24 will be intermittently fed into and through the kiln and after being discharged therefrom will be automatically transferred onto the return conveyor chains 100—101 to the front end of the kiln at which point they will be automatically transferred onto the feed conveyor chains 40—41 for an unloading and loading operation.

It will thus be seen that there has been provided by this invention a tunnel kiln and automatic loading and discharging apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a tunnel kiln having a longitudinally extending kiln chamber, spaced rails therein slidably to support a continuous train of batts of ware to be fired extending from the entrance to the discharge end of the kiln and a loading and discharge apparatus therefor comprising a conveyor mechanism for feeding batts of ware to be fired, power means to move said conveyor mechanism intermittently and successively to advance batts toward the kiln entrance, a movable dog arranged to engage the trailing edge of successive batts on the conveyor mechanism positively to move said batts into engagement with the train of batts and to advance the train by a predetermined distance, power operated reversible means to move said dog, a return conveyor mechanism extending from the discharge to the entrance end of the kiln, power means intermittently to move said conveyor, a power operated rotary batt transfer mechanism automatically to pick-up successive batts from the discharge end of the kiln and to swing said batts onto the return conveyor, means including a second power operated rotary batt transfer mechanism to pick-up successive batts from the other end of the return conveyor and to swing said batts onto the conveyor mechanism to facilitate unloading and loading batts at a single station at the entrance end of the kiln, and control mechanism to energize the several power means in sequence intermittently to transfer a batt from the return conveyor onto the conveyor mechanism, then to advance the batt into the kiln thereby causing another batt to emerge therefrom and then transfer a batt onto the return conveyor.

2. In a tunnel kiln, as claimed in claim 1, in combination with the parts and features therein specified of a power means including a motor to actuate said rotary transfer mechanism to load successive batts onto the feed conveyor, means including a timing mechanism to start said motor intermittently after predetermined time intervals to transfer a batt onto said feed conveyor, and means including a limit switch actuated in timed relation therewith to start the feed conveyor motor so as to feed a batt toward the kiln entrance.

3. In a tunnel kiln as claimed in claim 1, in combination with the parts and features therein specified of a limit switch actuated by and in timed relation with the movable dog to stop and reverse the driving motor after a new batt has advanced the batt train to a predetermined extent, and a second limit switch actuated by said dog when it reaches an inoperative position to stop the conveyor and pusher chain driving motor.

4. In a tunnel kiln as claimed in claim 1, in combination with the parts and features therein specified of a limit switch actuated by a batt as it leaves the discharge end of the kiln to start the discharge rotary transfer mechanism to pick-up said batt and to swing said batt onto the return conveyor, and a second limit switch actuated by and in timed relation with the transfer mechanism to start the return conveyor motor so as to convey a batt toward the other end of the return conveyor.

5. In a tunnel kiln as claimed in claim 1, in combination with the parts and features therein specified of an electric timer to control the starting of the loading transfer mechanism, and a limit switch actuated by a batt as it approaches the end of the return conveyor to energize said timer, said timer serving after a predetermined time interval to energize the transfer driving motor so as to transfer a batt onto the feed conveyor to facilitate unloading and loading.

6. In a tunnel kiln as claimed in claim 1, in combination with the parts and features therein specified in which the control mechanism includes an electric timer operatively connected to control actuation of the power operated loading transfer mechanism to control the rate of feed of batts to and through the kiln, and means to adjust the timer mechanism so as to control the rate of feed.

7. In a tunnel kiln having a longitudinally extending kiln chamber, spaced rails therein slidably to support a continuous train of batts of ware to be fired extending from the entrance to the discharge end of the kiln, and a loading and discharge apparatus therefor comprising a feed conveyor for feeding batts of ware to be fired, power means to move said conveyor intermittently and successively to advance batts toward the kiln, a carrier conveyor to receive batts from said feed conveyor, reversible power means to move said carrier conveyor to advance successive batts to the kiln entrance, a pusher chain arranged to be driven in either direction by said reversible power means, a dog on said chain arranged to engage the trailing edge of successive batts on the carrier conveyor positively to move the batts into engagement with the train of batts and to advance the train through a predetermined distance, a return conveyor extending from the discharge to the entrance end of the kiln, power means intermittently to move said conveyor, a power operated rotary transfer mechanism automatically to pick-up successive batts from the discharge end of the kiln and to swing said batts onto the return conveyor, and means including a second power operated rotary batt transfer mechanism to pick-up successive batts from the other end of the return conveyor and to swing said batts onto the feed conveyor to facilitate unloading and loading batts at the entrance end of the kiln.

8. In a tunnel kiln as claimed in claim 7, in combination with the parts and features therein specified of a limit switch actuated by a batt as it approaches the end of the feed conveyor to start the carrier and pusher chain driving motor to cause the batt to move toward the kiln entrance, and a second limit switch actuated by a batt as it leaves the said conveyor to stop the feed conveyor motor.

9. In a tunnel kiln having a longitudinally extending kiln chamber, spaced rails therein slidably to support a continuous train of batts of ware to be fired extending from the entrance to the discharge end of the kiln, and a loading and discharge apparatus therefor comprising a feed conveyor to feed batts of ware to be fired, power means to move said conveyor intermittently and successively to advance batts toward the kiln entrance, a carrier conveyor to receive batts from said feed conveyor, reversible power means to move said carrier conveyor to advance batts to the kiln entrance, an overunning clutch between said latter power means and the carrier conveyor, a pusher chain located adjacent to said carrier conveyor, said pusher chain being driven in either direction by said reversible power means, a dog fixedly mounted on said pusher chain successively to engage the trailing edge of each batt on the carrier conveyor to move the batts into engagement with the train of batts to advance the train by a distance equal to the length of one batt, a return conveyor below the tunnel kiln extending from the discharge to the entrance end of the kiln, a rotary batt transfer mechanism automatically to pick-up successive batts from the discharge end of the kiln and to swing said batts onto the return conveyor, power means intermittently to move said return conveyor, and means including a second rotary batt transfer mechanism to pick-up successive batts from the return conveyor and to swing said batts onto the feed conveyor to facilitate unloading and loading at a single station.

10. In a tunnel kiln having a longitudinally extending kiln chamber, spaced rails therein slidably to support a continuous train of batts of ware to be fired extending from the entrance to the discharge end of the kiln, and a loading and discharge apparatus therefor comprising spaced parallel conveyor chains to feed batts of ware to be fired, power means to move said chains intermittently and successively to advance batts toward the kiln entrance, a second pair of spaced parallel carrier chains to receive batts from the said feed conveyor chains, reversible power means to move said carrier chains to advance batts to the kiln entrance, overrunning clutches between said latter power means and the carrier chains, a pair of spaced parallel pusher chains located between said carrier chains, said pusher chains being driven in either direction by said reversible power means, a dog fixedly mounted on each of said pusher chains simultaneously to engage the trailing edge of successive batts on the carrier chains to move the batts into engagement with the train of batts and to advance the train by a predetermined distance, a return conveyor below the tunnel kiln extending from the discharge to the entrance end thereof, a rotary batt transfer mechanism automatically to pick-up successive batts from the discharge end of the kiln and to swing said batts onto the return conveyor, power means intermittently to move said return conveyor, and means including a second rotary batt transfer mechanism to pick-up successive batts from the return conveyor and to swing said batts onto the feed conveyor chains to facilitate loading and unloading at a single station.

11. In a tunnel kiln having a longitudinally extending kiln chamber, spaced rails therein slidably to support a continuous train of batts of ware to be fired extending from the entrance to the discharge end of the kiln, and a loading and discharge apparatus therefor comprising a feed conveyor for feeding batts of ware to be fired, power means including a motor to move said conveyor intermittently and successively to advance batts toward the kiln, a carrier conveyor to receive batts from said feed conveyor, power means including a reversible motor to move the carrier conveyor to advance batts to the kiln entrance, a pusher chain arranged to be driven in either direction by said reversible motor, a dog on said chain arranged to engage the trailing edge of successive batts on the carrier conveyor to move the batts into engagement with the train of batts and to advance the train through a predetermined distance, a return conveyor extending from the discharge to the entrance end of the kiln, power means including a motor intermittently to move said conveyor, a rotary batt transfer mechanism including a pair of spaced rotary arms, a batt engaging pick-up member pivotally supported adjacent to the end of each of said arms automatically to pick-up successive batts from the discharge end of the kiln and to swing said batts onto the return conveyor, means including a motor to actuate said transfer mechanism, means including a setcond rotary batt transfer mechanism to pick-up successive batts from the other end of the return conveyor and to swing said batts onto the feed conveyor to facilitate unloading and loading batts at a single station at the entrance end of the kiln, and means including a motor to actuate said latter mechanism.

References Cited in the file of this patent

UNITED STATES PATENTS

| | | |
|---|---|---|
| 694,519 | Baker | Mar. 4, 1902 |
| 2,224,895 | Brooke | Dec. 17, 1940 |
| 2,523,025 | Jeppson et al. | Sept. 19, 1950 |
| 2,623,626 | Ditolla | Dec. 30, 1952 |